(12) United States Patent
Romesburg et al.

(10) Patent No.: US 7,953,456 B2
(45) Date of Patent: May 31, 2011

(54) ACOUSTIC ECHO REDUCTION IN MOBILE TERMINALS

(75) Inventors: Eric Douglas Romesburg, Chapel Hill, NC (US); William Chris Eaton, Cary, NC (US)

(73) Assignee: Sony Ericsson Mobile Communication AB, Lund (SE)

( * ) Notice: Subject to any disclaimer, the term of this patent is extended or adjusted under 35 U.S.C. 154(b) by 813 days.

(21) Appl. No.: 11/776,794

(22) Filed: Jul. 12, 2007

(65) Prior Publication Data

US 2009/0017878 A1    Jan. 15, 2009

(51) Int. Cl.
*H04B 3/21* (2006.01)
(52) U.S. Cl. .................................. 455/570; 379/406.01
(58) Field of Classification Search ............... 455/550.1, 455/569.1, 570, 575.1; 379/388.1, 406.1, 379/406.08
See application file for complete search history.

(56) References Cited

U.S. PATENT DOCUMENTS

| 5,323,458 | A | 6/1994 | Park et al. |
| 7,035,396 | B1 | 4/2006 | Ubowski et al. |
| 2003/0185402 | A1* | 10/2003 | Benesty et al. .......... 379/406.08 |
| 2006/0034448 | A1* | 2/2006 | Parry ...................... 379/406.01 |

FOREIGN PATENT DOCUMENTS

| JP | 11-225391 A | 8/1999 |
| JP | 2004 297185 A | 10/2004 |
| WO | WO 99/66492 A | 12/1999 |

OTHER PUBLICATIONS

Murtazin, Elder "Review Motorola E398" website. <"http://www.mobile-review.com/print.php?filename=/review/motorola-e398-en.shtml"> 17 pages. (May 17, 2004).
International Search Report and Written Opinion for International Application No. PCT/US2008/001861 mailed May 20, 2008 (12 pages).
PCT Written Opinion (3 pages) corresponding to International Application No. PCT/US2008/001861; Mailing Date: Jul. 10, 2009.

* cited by examiner

*Primary Examiner* — Thanh C Le
(74) *Attorney, Agent, or Firm* — Myers Bigel Sibley & Sajovec

(57) ABSTRACT

An electronic device includes first and second speakers, a microphone, and circuitry configured to generate first and second audio signals in response to a source audio signal, to play the first audio signal over the first speaker, and to play the second audio signal over the second speaker. The first and second audio signals are configured, and the first and second speakers are positioned, so that the first audio signal output by the first speaker and the second audio signal output by the second speaker combine destructively at the microphone.

20 Claims, 7 Drawing Sheets

ACOUSTIC ECHO REDUCTION IN MOBILE TERMINALS

FIELD OF THE INVENTION

The present invention relates to portable electronic devices, and in particular to portable electronic devices including speakers and microphones.

BACKGROUND

Mobile telephones and other types of portable electronic devices can include a speaker or multiple speakers for playing audio signals, such as voice audio signals, music audio signals, and the like. For example, most mobile telephones include a low-power speaker located in an earpiece that is pressed against the ear of a user of the telephone. Received audio signals (e.g., voice signals) are played over the speaker and can be heard by the telephone's user. The audio signal played over such a speaker is typically limited in power to reduce the possibility of causing hearing damage to the user.

The functionality of mobile telephones has increased in recent years. For example, many mobile telephones are now configured to act as speakerphones. In a speakerphone mode, the received audio signal is played at a loud level over an amplified loudspeaker, that may be separate from the low-power speaker located in the earpiece, so as to be heard by a listener located away from the telephone. Words spoken by the user are picked up by a microphone located in the housing of the mobile telephone.

In speakerphone mode, echoing may be encountered by remote calling parties communicating with users of mobile telephones and similar electronic devices. That is, sounds output by the amplified loudspeaker can be picked up by the microphone and transmitted back to the remote calling party, which hears the sounds as an echo.

Various approaches have been attempted to reduce echoing in mobile telephones operating in speakerphone mode. For example, a mobile telephone can be operated in a half-duplex mode in which the microphone is muted (turned off) when sound is being played through the amplified speaker. This approach is not fully satisfactory, since some speech may be lost and it may be difficult for the parties to have a natural conversation.

Some attempts have been made to dynamically attenuate echos by subtracting a scaled and delayed replica of the speaker output signal from the microphone input signal. However, such approaches can be difficult and expensive to implement, and may not be particularly effective in a mobile environment, because of the non-linear and time-varying echo paths that can be present.

In some devices, the speaker has been placed on the opposite side of the device housing to reduce echoing. This constrains the design of the device, and may not be desirable for devices that play stereo audio for a user.

SUMMARY

An electronic device according to some embodiments of the invention includes first and second speakers, a microphone, and circuitry configured to generate first and second audio signals in response to a source audio signal, to play the first audio signal over the first speaker, and to play the second audio signal over the second speaker. The first and second audio signals are configured, and the first and second speakers are positioned, so that the first audio signal output by the first speaker and the second audio signal output by the second speaker combine destructively at the microphone.

The second audio signal may include an inverted replica of the first audio signal. In some embodiments, the second audio signal may include an scaled and inverted replica of the first audio signal.

The first audio signal may include a plurality of frequencies and the second audio signal may include a plurality of frequencies. Respective ones of the plurality of frequencies of the second audio signal may be scaled and phase shifted relative to corresponding ones of the plurality of frequencies of the first audio signal. In some embodiments, the second audio signal may be phase shifted relative to the first audio signal.

The electronic device may further include a first filter configured to filter the source signal to generate the first audio signal and a second filter configured to generate the second audio signal. The first filter may include a first set of filter coefficients configured to equalize the source signal and the second filter may include a second set of filter coefficients configured to cause the first and second audio signals to interfere destructively at the microphone.

In some embodiments, the electronic device may include a housing that is movable between a first position and a second position (e.g. an open position and a closed position). When the housing is in the first position the first filter may include a first set of filter coefficients and the second filter may include a second set of filter coefficients configured to cause the first and second audio signals to interfere destructively at the microphone, and when the housing is in the second position the second filter may include a third set of filter coefficients configured to cause the first and second audio signals to interfere destructively at the microphone.

The electronic device may include a mobile telephone configured to operate in a speakerphone mode and a non-speakerphone mode, and the circuitry may be configured to play the first audio signal over the first speaker, and to play the second audio signal over the second speaker in the speakerphone mode.

The circuitry may be configured to receive the source audio signal as a stereophonic signal, to convert the source audio signal to a first monaural signal, and to generate the second audio signal as a second monaural signal from the first monaural signal.

The source audio signal may include a ring tone, and the circuitry may be further configured to play the first audio signal over the first speaker and the second audio signal over the second speaker in response to an incoming call.

The circuitry may be configured to operate in a voice answer mode, and the circuitry may be further configured to receive a voice signal using the microphone while playing the first audio signal over the first speaker and the second audio signal over the second speaker.

The microphone may be positioned on an arc of cancellation relative to the first speaker and the second speaker, and the circuitry may adjust a power level of the first audio signal or the second audio signal so that the power of the first audio signal received at the microphone is about equal to the power of the second audio signal received at the microphone.

The second audio signal may include an scaled and inverted replica of the first audio signal, the first audio signal may include a plurality of frequencies, the second audio signal may include a plurality of frequencies, and the circuitry may phase shift respective ones of the plurality of frequencies of the second audio signal relative to corresponding ones of the plurality of frequencies of the first audio signal.

An electronic device according to some embodiments of the invention includes first and second speakers, a microphone and circuitry configured to receive a source audio signal, to generate first and second audio signals in response to the source audio signal, to play the first audio signal over the first speaker and to play the second audio signal over the second speaker. The first and second audio signals may be configured so that the first audio signal output by the first speaker and the second audio signal output by the second speaker combine destructively at a locus of cancellation. The microphone is located on the locus of cancellation.

The locus of cancellation may include a plane located mid-way between the first and second speakers and normal to a line extending between the first and second speakers. In some embodiments, the locus of cancellation may include a curved surface extending between the first and second speakers.

Some embodiments of the invention provide methods of operating a portable electronic device including first and second speakers and a microphone positioned relative to the speakers. The methods include generating first and second audio signals in response to a source audio signal, playing the first audio signal over the first speaker, and playing the second audio signal over the second speaker. The first and second audio signals are generated so that the first audio signal output by the first speaker and the second audio signal output by the second speaker combine destructively at the microphone.

The second audio signal may include an inverted replica of the first audio signal. In some embodiments, the second audio signal may include an scaled and inverted replica of the first audio signal.

The first audio signal may include a plurality of frequencies, and the second audio signal may include a plurality of frequencies, and the method may further include scaling and phase shifting respective ones of the plurality of frequencies of the second audio signal relative to corresponding ones of the plurality of frequencies of the first audio signal. The methods may further include receiving the source audio signal as a stereophonic signal, converting the source audio signal to a first monaural signal, and generating the second audio signal as a second monaural signal.

The source audio signal may include a ring tone, the methods may further include playing the first audio signal over the first speaker and the second audio signal over the second speaker in response to an incoming call, and receiving a voice signal using the microphone while playing the first audio signal over the first speaker and the second audio signal over the second speaker.

DESCRIPTION OF THE DRAWINGS

The accompanying drawings, which are included to provide a further understanding of the invention and are incorporated in and constitute a part of this application, illustrate certain embodiment(s) of the invention. In the drawings.

DETAILED DESCRIPTION OF EMBODIMENTS

Figure 1:
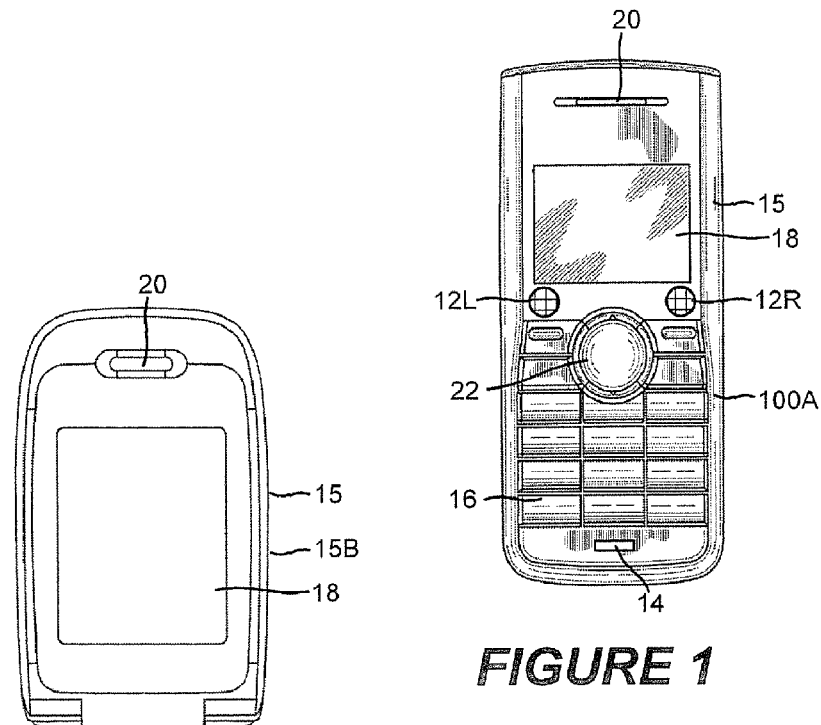
FIG. 1 illustrates a mobile telephone according to some embodiments of the invention.

Embodiments of the present invention will now be described more fully hereinafter with reference to the accompanying drawings. This invention should not be construed as limited to the embodiments set forth herein; rather, these embodiments are provided so that this disclosure will be thorough and complete, and will fully convey the scope of the invention to those skilled in the art. Like numbers refer to like elements throughout. Furthermore, the various features and regions illustrated in the figures are illustrated schematically. Accordingly, the present invention is not limited to the relative size and spacing illustrated in the accompanying figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

Portable electronic devices, such as wireless mobile telephones, according to embodiments of the invention can have a variety of shapes, sizes and housing types. Examples of several types of mobile telephone housings are shown in FIGS. 1 to 3B. For example, a mobile telephone 100A according to some embodiments is illustrated in FIG. 1. The mobile telephone 100A includes a housing 15 that houses and protects the electronics of the mobile telephone 100A. The mobile telephone 100A includes an LCD display 18 and a keypad 16. The mobile telephone 100A further includes a multifunction control/input button 22 that can be used to select menu items and/or to input commands to the mobile telephone 100A.

The mobile telephone 100A includes a microphone port 14 and an earphone/speaker 20. The housing 15 may be designed to form an acoustic seal to the user's ear when the earphone/speaker 20 is placed against the user's head. The mobile telephone 100A may be configured to play video files and or audio files, such as song files, which may be stereophonic signals. Accordingly, the mobile telephone 100A includes, in addition to the earphone/speaker 20, a pair of amplified speakers 12L, 12R, that may be used, for example, to play stereophonic audio. The amplified speakers 12L, 12R may also be used as loudspeakers during hands-free speakerphone operations. The amplified speakers 12L, 12R may be positioned away from the earphone/speaker 20 for safety (i.e. in case the user puts the telephone to his/her ear while amplified sound is being played over the speakers 12L, 12R). However, the speakers 12L, 12R may be positioned on the same side of the housing 15 as the microphone 14.

Figure 2A:
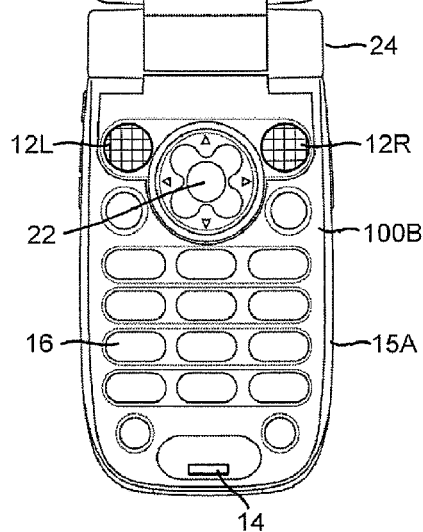
FIGS. 2A-2B illustrate a flip-type mobile telephone according to some embodiments of the invention.
Figure 2B:
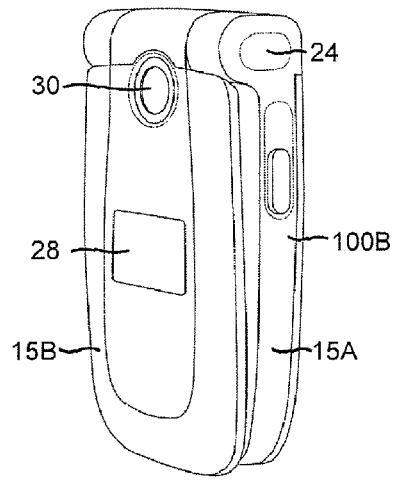

A flip-style mobile telephone 100B is illustrated in FIGS. 2A and 2B. The flip-style mobile telephone 100B is shown in the open position in FIG. 2A and the closed position in FIG. 2B. The mobile telephone 100B includes a housing 15 that includes a lower housing 15A and an upper housing, or "flip" portion 15B that are rotatably connected by means of a hinge 24. The mobile telephone 100B includes a primary LCD display 18 on the inside of the flip 15B and a keypad 16 on the inside of the lower housing 15A. The mobile telephone 100B further includes a multifunction control/input button 22.

The mobile telephone 100A includes a microphone port 14 on the lower housing 15A and an earphone/speaker 20 on the inside of the flip 15B. The mobile telephone 100B further includes a pair of amplified stereophonic speakers 12L, 12R on the lower housing 15B. The amplified speakers 12L, 12R may also be used as loudspeakers during hands-free speakerphone operations.

As shown in FIG. 2B, a secondary display 28 and a camera lens 30 may be located on the outside of the flip 15B.

Figure 3A:
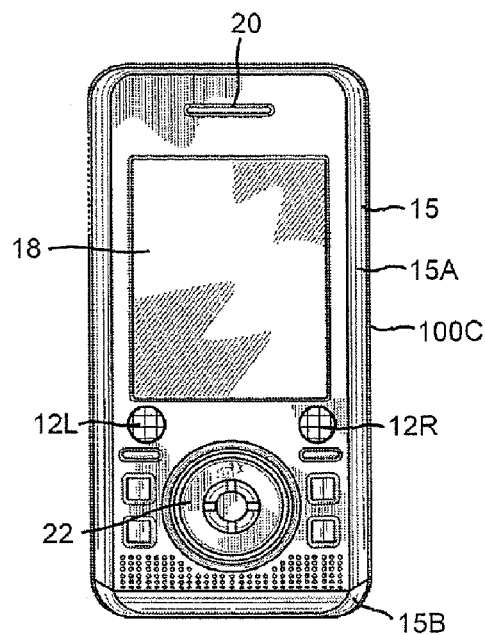
FIGS. 3A-3B illustrate a slider-type mobile telephone according to some embodiments of the invention.
Figure 3B:
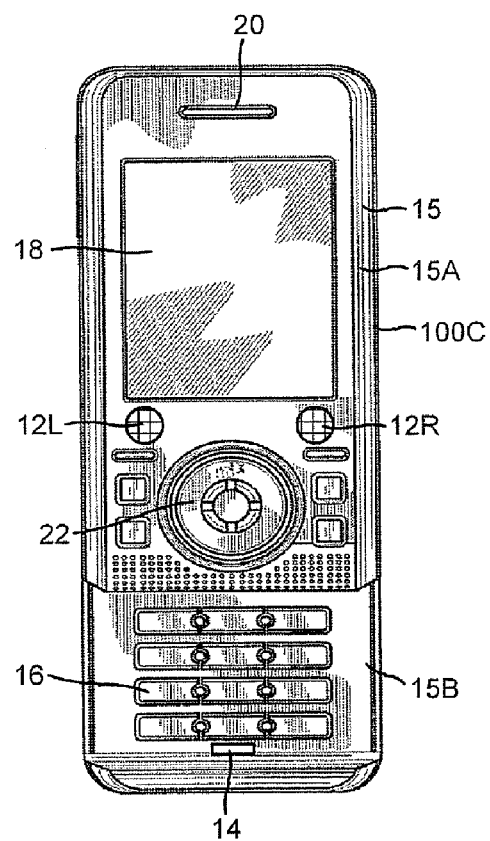

A slider-style mobile telephone 100C is illustrated in FIGS. 3A and 3B. The slider-style mobile telephone 100C is shown in the closed (retracted) position in FIG. 3A and the open (extended) position in FIG. 3B. The mobile telephone 100C includes a housing 15 that includes an upper housing 15A and a retractable lower housing 15B that is slidably connected to the upper housing 15A. The mobile telephone 100C includes an LCD display 18 on the outside of the upper housing 15A and a keypad 16 on the lower housing 15B. The keypad 16 is hidden when the mobile telephone 100C is in the retracted position, as shown in FIG. 3A. The mobile telephone 100C further includes a multifunction control/input button 22 on the upper housing 15A that may be accessed by a user when the telephone 100C is in the closed/retracted position.

The mobile telephone 100C includes a microphone port 14 on the lower housing 15B and an earphone/speaker 20 on the upper housing 15A. The mobile telephone 100C further includes a pair of amplified stereophonic speakers 12L, 12R on the outside of the upper housing 15A. The amplified speakers 12L, 12R may also be used as loudspeakers during hands-free speakerphone operations.

Figure 4:
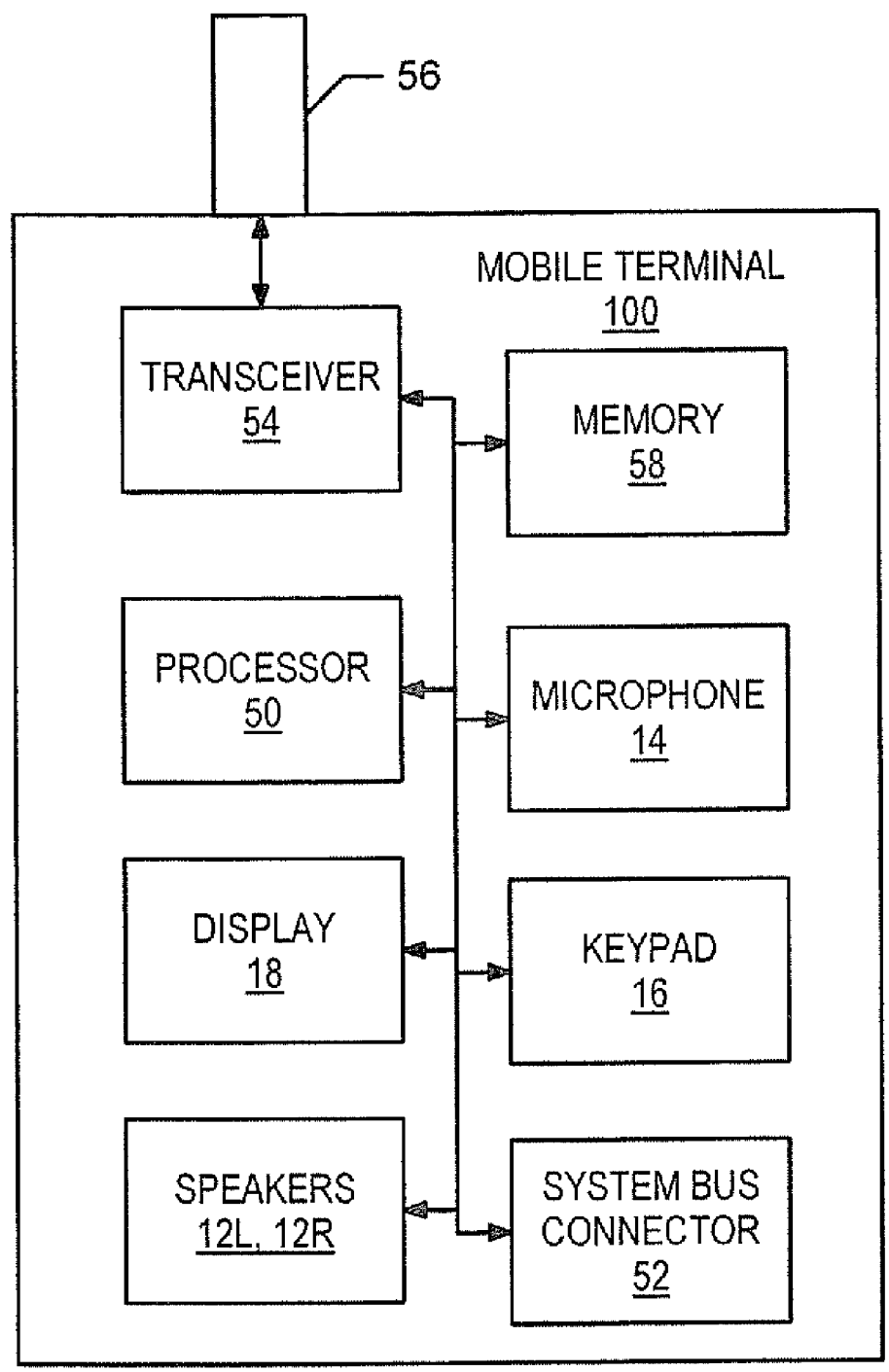
FIG. 4 is a schematic block diagram of a portable electronic device according to some embodiments of the invention.

An exemplary block diagram of a personal electronic device, such as a wireless mobile telephone 100, is shown in FIG. 4. As shown therein, an exemplary mobile telephone 100 in accordance with some embodiments of the present invention includes a keypad 16, a display 18, a transceiver 54, a memory 58, a microphone 14, and stereo speakers 12L, 12R that communicate with and/or receive signals from a processor 50. The transceiver 54 typically includes a transmitter circuit and a receiver circuit, which cooperate to transmit and receive radio frequency signals to remote transceivers via an antenna 56, which may be positioned internal or external to the housing of the telephone 100. The radio frequency signals transmitted between the mobile telephone 100 and the remote transceivers may comprise both traffic signals (e.g. voice) and control signals (e.g., paging signals/messages for incoming calls), which are used to establish and maintain communication with another party or destination.

The processor 50 is also coupled to a system bus connector 52, to which accessory devices may be attached. The accessory devices may communicate with the processor 50 through the system bus connector 52. In particular, the system bus connector 52 may provide conductors that permit the processor 50 to transmit/receive analog and/or digital audio and/or video signals, as well as data and/or control signals, to connected accessories. The system bus connector 52 may also provide power and/or ground connections for accessories attached thereto.

The memory 58 may be a general purpose memory that is used to store both program instructions for the processor 50 as well as data, such as audio data, video data, configuration data, and/or other data that may be accessed and/or used by the processor 50. The memory 58 may include a nonvolatile read/write memory, a read-only memory and/or a volatile read/write memory. In particular, the memory 58 may include a read-only memory in which basic operating system instructions are stored, a non-volatile read/write memory in which re-usable data, such as configuration information, directory information, and other information may be stored, as well as a volatile read/write memory, in which short-term instructions and/or temporary data may be stored. The memory 58 may be further configured to store a digital information signal such as a digital audio and/or video signal generated or received by the mobile telephone 100.

The transceiver 54 is configured to communicate data over a wireless interface to a remote unit, such as a cellular base station, which communicates with a mobile telephone switching office (MTSO) via a wired or wireless link.

The transceiver 54 can include, for example, a cellular communication module, a Bluetooth module, and/or a wireless local area network (WLAN) module. With a cellular communication module, the mobile telephone 100 can communicate with a base station using one or more cellular communication protocols such as, for example, Advanced Mobile Phone Service (AMPS), ANSI-136, Global Standard for Mobile (GSM) communication, General Packet Radio Service (GPRS), enhanced data rates for GSM evolution (EDGE), code division multiple access (CDMA), wideband-CDMA, CDMA2000, and Universal Mobile Telecommunications System (UMTS). The base station may be connected to a Mobile Telephone Switching Office (MTSO), which, in turn, may be connected to a telephone network, a computer data communication network (e.g. the internet), and/or another network.

With a Bluetooth module, a mobile telephone 100 can communicate with other wireless communication terminals via an ad-hoc network. With a WLAN module, the mobile telephone 100 can communicate through a WLAN router (not shown) using a communication protocol that may include, but is not limited to, 802.11a, 802.11b, 802.11e, 802.11g, 802.11i, 802.11n, etc.

As noted above, a mobile telephone 100 can be configured to operate in a speakerphone mode, in which voice signals received by the telephone are played over amplified speakers 12, while words spoken by a local user are picked up by the microphone 14. In speakerphone mode, the received voice signal is played at a loud level over an amplified loudspeaker, so as to be heard by a listener located some distance away from the telephone.

Echoing can be a problem for the telephone 100 operating in speakerphone mode. In particular, sounds output by the amplified loudspeakers 12 can be picked up by the microphone 14 and transmitted back to the remote calling party, who hears the sounds as an echo.

As noted above, operating the mobile telephone 100 in half-duplex mode, in which the microphone 14 is muted (turned off) when sound is being played through the amplified speakers 12, may be undesirable, because it may be difficult for the parties to have a natural conversation. Furthermore, electronic echo cancellation/reduction in the microphone signal may not be desirable because of the complexity and cost of its implementation, and may not be particularly effective in a mobile environment, because of the non-linear and time-varying echo paths that can be present.

Some embodiments of the invention perform acoustic echo cancellation/reduction in the broadcasted speakerphone sound in order to cancel and/or reduce unwanted echoing from the speakers to the microphone in a full-duplex communication mode. Some embodiments of the invention may be particularly useful for full-duplex speakerphone communications. However, some embodiments of the invention may be used during other modes of operation of a mobile telephone, such as to facilitate voice answering of calls while playing a ring signal or ring tone over a speaker.

According to some embodiments of the invention, acoustic echo cancellation can be performed by playing a first audio signal over one of a pair of speakers 12L, 12R and playing a second audio signal over the other one of the speakers 12L, 12R. The first audio signal and the second audio signal may be configured so that the audio signals interfere destructively to substantially cancel one another at the location of the microphone 14. Accordingly, the power level of the combined audio signal detected by the microphone 14 from the speakers 12L, 12R may be lower than the power level of the combined first and second audio signals, and may be lower than the power levels of either the first audio signal or the second audio signal. It will be appreciated that destructive interference need not completely cancel or erase either the first audio signal or the second audio signal. In some embodiments, destructive interference may result in the received signal having less power than either the first audio signal or the second audio signal, or than the combined power of the first audio signal and the second audio signal.

Figure 5A:
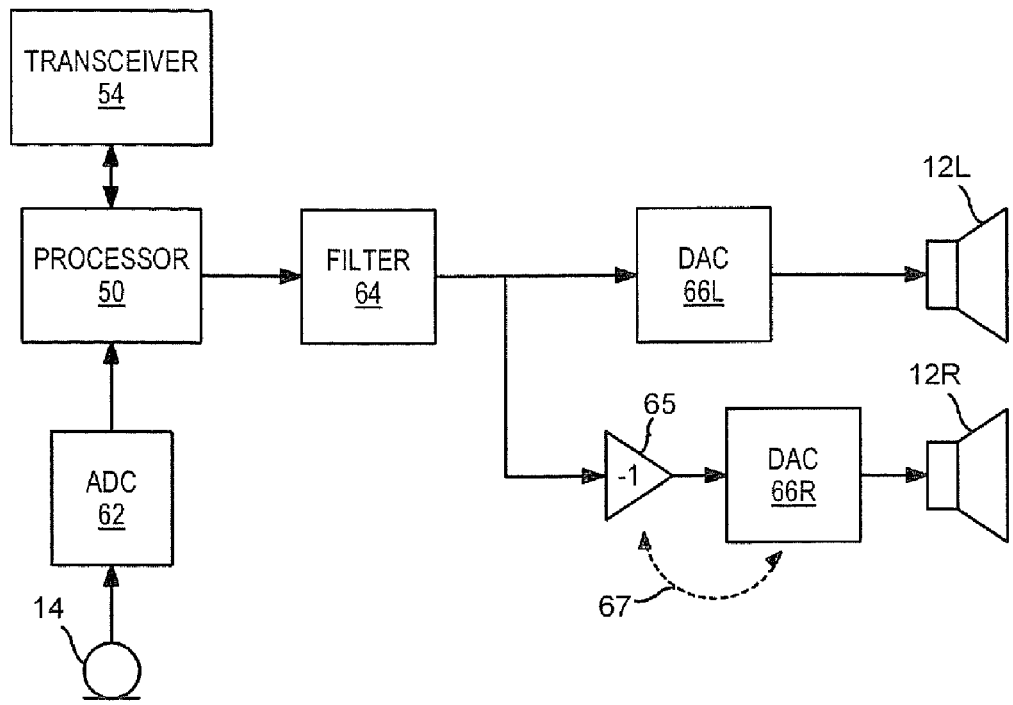
FIGS. 5A-5B are schematic block diagrams illustrating some electronic components of a portable electronic device according to some embodiments of the invention.
Figure 5B:
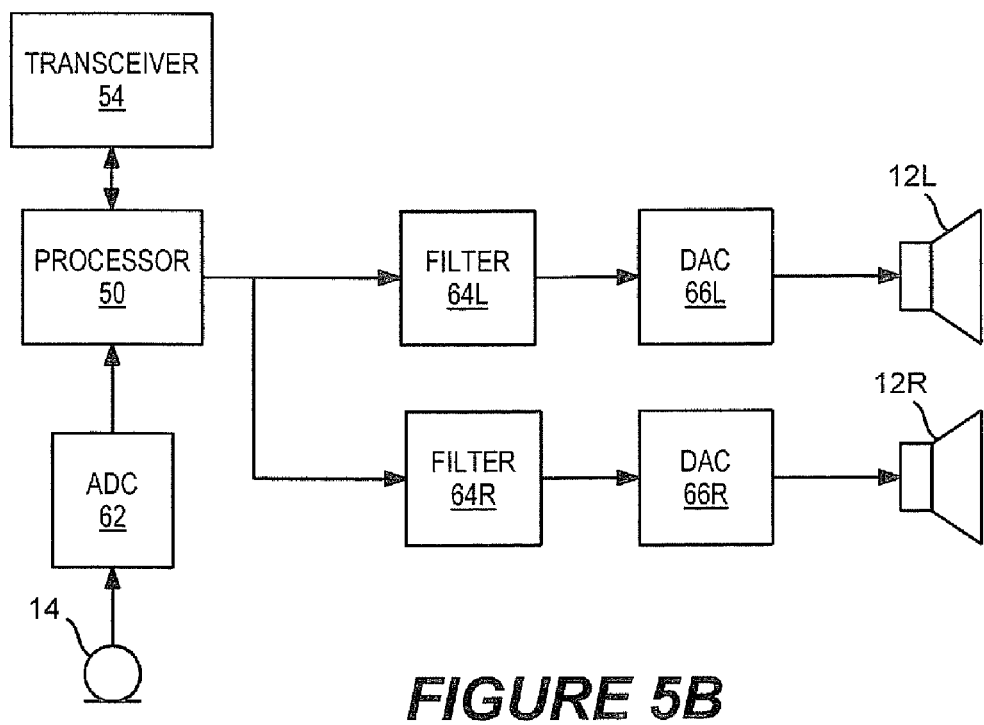

Some exemplary audio paths for portable electronic devices according to embodiments of the invention are illustrated in FIGS. 5A and 5B. For example, referring to FIG. 5A, an audio path for a portable electronic device including a processor 50, a microphone 14 and first and second speakers 12L, 12R is illustrated.

Sounds received by the microphone 14 are converted to digital signals by an analog-to-digital converter (ADC) 62 and provided to the processor 50. The sounds may be transmitted by the transceiver 54 to a remote party, for example.

The processor 50 may cause source audio signals, such as received voice signals received from a remote device through the transceiver 54 and/or stored signals, such as ring signals, ring tones and/or song files, to be played over the speakers 12L, 12R. As illustrated in FIG. 5A, a source digital audio signal generated and/or processed by the processor 50 can be filtered by a filter 64 to reduce noise and/or signal components outside a defined range. The filtered signal may be converted to analog by a digital-to-analog converter (DAC) 66L and played over the first speaker 66L. According to some embodiments of the invention, the filtered signal can be inverted by an inverter 65, and the inverted signal can be converted to analog by a DAC 66R and played over the second speaker 12R. In some embodiments, the signal may be first converted to analog by the DAC 66R and then inverted, as indicated by the dashed line 67.

Referring to FIG. 5B, a separate filter 64L, 64R may be provided for each speaker 12L, 12R. In this case, one of the filters 64R, 64L may also invert the audio signal received from the processor 50.

While the elements of the audio paths illustrated in FIGS. 5A and 5B are shown as separate blocks for purposes of illustration, it will be appreciated that the functionality of individual blocks may be combined into a single circuit or may be distributed among several circuits. For example, the functions of analog-to-digital conversion, digital-to-analog conversion, and/or filtering could be performed by a single signal processing chip. In some embodiments, a specialized microprocessor may be configured to perform functions such as analog-to-digital conversion, digital-to-analog conversion, and/or filtering. Furthermore, it will be appreciated that the processor 50 may include a general purpose programmable controller and/or a special purpose processor, such as a digital signal processor.

Figure 6A:
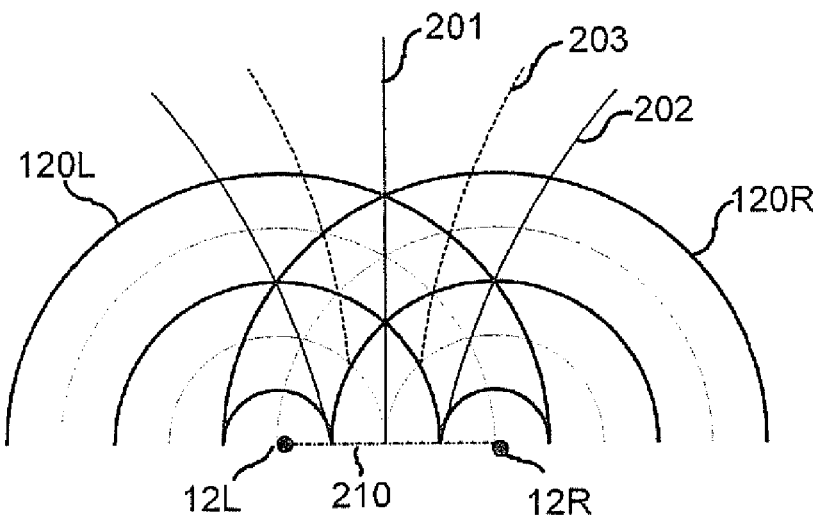
FIGS. 6A-6B illustrate constructive and destructive interference of sound waves in accordance with some embodiments of the invention.
Figure 6B:
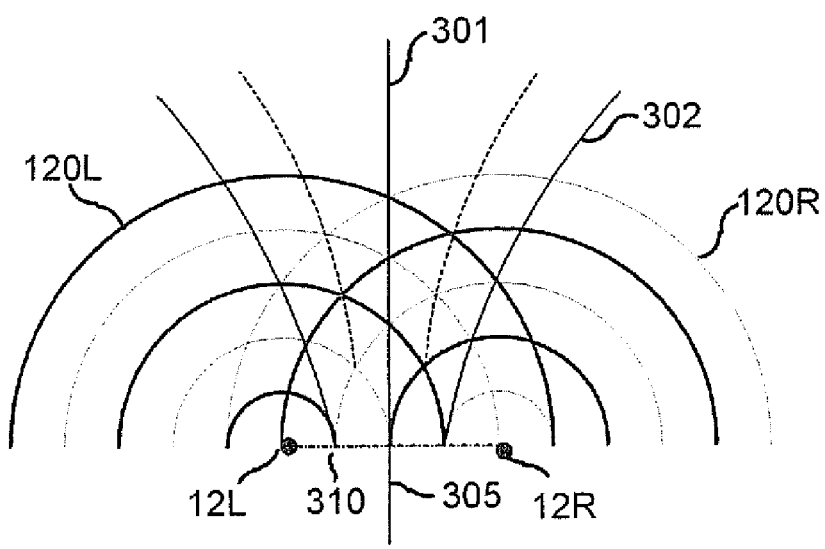

The concepts of constructive and destructive interference are well-known in the field of wave dynamics. Destructive interference is presently used in applications such as noise-cancelling headphones. Constructive and destructive interference concepts are illustrated in FIGS. 6A and 6B, which illustrate interference of wavefronts emanating from spaced-apart audio sources 12L, 12R. In particular, FIG. 6A illustrates interference of sound waves 120L, 120R emanating from spaced-apart speakers 12L, 12R, respectively. The sound waves 120L, 120R are represented by solid lines which represent wave crests (i.e. areas of greatest compression) and by dotted lines that represent wave troughs (i.e. areas of greatest rarefaction). The sound waves 120L, 120R are in phase with one another and have a single frequency.

When the sound waves 120L, 120R cross each other, interference occurs, which alters the sound detected at the point of interference. When two crests or two troughs cross, constructive interference occurs, causing more compression or rarefaction at the crossing location than would occur in the absence of interference. However, when a crest of one sound wave 120R crosses a trough of the other sound wave 120L, the waves cancel each other at the crossing location, resulting in so-called destructive interference.

As can be seen from FIG. 6A, constructive interference occurs at locations defined along a medial line 201 that is mid-way between the speakers 12L, 12R and that is perpendicular to an imaginary line 210 running between the two speakers 12L and 12R. It will be appreciated that each point on the line 201 is equidistant from each of the two speakers 12L and 12R, which means that the signal power received at each point on the line 201 from each of the two speakers 12L and 12R will be about the same. Constructive interference also occurs along arcs 202 that define locations where peaks of one wave cross peaks of the other wave and troughs of one wave cross troughs of the other wave. It will be appreciated that the locations of the arcs 202 depend on the wavelength of the sound waves 120L, 120R, since the locations where peaks of one wave cross peaks of the other wave, and troughs of one wave cross troughs of the other wave, depend on the wavelengths of the waves. However, the location of the medial line 201 does not change with wavelength. The points of constructive interference are often referred to as nodes.

It will be appreciated that destructive interference occurs at locations defined by arcs 203 where peaks of one wave cross troughs of the other wave. However, assuming that the power level of both signals output by the sources 12L, 12R is the same, destructive interference along arcs 203 will not result in total cancellation of the waves, since wave power decreases with distance from the source, and the arcs 203 describe locations that are not equidistant from the speakers 12L, 12R. The points of destructive interference are often referred to as anti-nodes.

Referring to FIG. 6B, cancellation of waves may be performed by transmitting a first audio signal 120L from a first speaker 12L and simultaneously transmitting a second audio signal 120R' that is an inverted version of the first audio signal from a second speaker 12R. That is, the second audio signal 120R is the same as the first audio signal 120L, except that the troughs and crests are reversed (i.e. the polarity of the signals is reversed). Stated differently, the first audio signal 120L and the second audio signal 120R' are 180° out of phase.

As shown in FIG. 6B, crests of the first audio signal and troughs of the second audio signal, and vice versa, cross at locations along a medial line 301 that defines points that are equidistant from both speakers 12L and 12R and that is perpendicular to an imaginary line 310 running between the two speakers 12L and 12R. In three dimensions, the line 301 falls on a medial plane 305 that is perpendicular to the line 310 between the two speakers 12L and 12R. The plane 305 can be referred to as a "plane of cancellation," since the first and second audio signals 120L, 120R combine destructively and have the same signal power at all points on the plane 305. It will be appreciated that the location of the plane of cancellation 305 is independent of wavelength. Accordingly, a sound wave including a range of wavelengths can be cancelled at the plane of cancellation 305.

Some signal reduction also occurs along arcs 302. However, as noted above, assuming that the power of both signals output by the speakers 12L, 12R is the same, destructive interference along arcs 302 will not result in total cancellation of the waves, since wave power decreases with distance from the source, and the arcs 302 describe locations that are not equidistant from the speakers 12L, 12R.

Figure 7A:
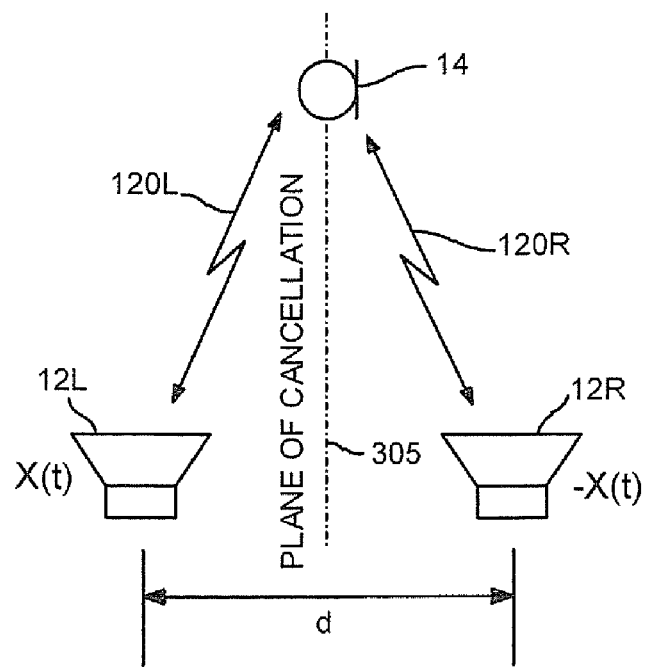
FIGS. 7A-7B illustrate configurations of speakers and microphones for acoustic echo cancellation/reduction according to some embodiments of the invention.

FIG. 7A illustrates systems/methods for acoustic echo reduction/cancellation according to some embodiments of the invention. In particular, FIG. 7A illustrates a possible configuration of speakers 12L, 12R and a microphone 14 according to some embodiments. As shown therein, the speakers 12L and 12R are separated by a distance d. First and second audio signals 120L, 120R are generated in response to a source audio signal, such as a voice signal received over a transceiver and/or a ring tone. The first audio signal 120L (having a value X(t)) is played over the first speaker 12L, and the second audio signal 120R (having a value –X(t)), which is simply an inverted (i.e. anticoherent) version of the first audio signal 120L, is played over the second speaker 12R. Accordingly, a medial plane of cancellation 305 is defined between the first and second speakers 12L, 12R such that all points on the medial plane 305 are equidistant from both the first and second speakers 12L, 12R. That is, the medial plane 305 is defined mid-way between the first and second speakers 12L, 12R and is perpendicular to an imaginary line extending between the first and second speakers 12L, 12R.

In order to cancel each other effectively at the microphone, the two waveforms output by the speakers 12L, 12R must be anticoherent (or nearly anticoherent) at the location of the microphone 14. Two multifrequency waveforms are fully coherent with each other if they both have exactly the same range of wavelengths and the same phase differences at each of the constituent wavelengths. Two multifrequency waveforms are anticoherent with each other if they both have exactly the same range of wavelengths and the same phase differences at each of the constituent wavelengths, and have opposite polarities. That is, two waveforms are anticoherent if one of the waveforms is an inverted version of the other (i.e., 180° out of phase).

The microphone 14 is positioned on the plane of cancellation 305. Accordingly, the first audio signal 120L output by the first speaker 12L and the second audio signal 120R output by the second speaker 12R may destructively interfere with each other at the microphone 14. Because the microphone is located at a position that is equidistant from both the first and second speakers 12L, 12R, the destructive interference can substantially attenuate both the first and second audio signals 120L, 120R, so that the signal received by the microphone 14 from the first and second speakers 12L, 12R may be substantially less than the audio signals 120L, 120R output by the first and second speakers 12L, 12R. In some embodiments, attenuation of as much as 30 dB may be obtained.

Thus, for example, during a speakerphone call, a voice signal may be received by the mobile telephone 100 from a remote caller via the transceiver 54. The voice signal may be a monaural digital signal having a value represented by X(n). The voice signal is inverted by the controller 50 to form an inverted signal –X(n). The voice signal X(n) and the inverted signal –X(n) are converted to analog, for example via first and second digital-to-analog converters 66L, 66R to form first and second audio signals 120L and 120R having analog values of X(t) and –X(t) respectively.

The first audio signal 120L is played over the first speaker 12L, and the second audio signal 120R is played over the second speaker 12R. As described above, the first and second audio signals 12L, 12R acoustically cancel each other at the microphone 14, which may reduce the echo that may be picked up at the microphone 14 and transmitted back to the remote caller via the transceiver 54. However, sound generated by the local user, such as speech, is picked up by the microphone 14 and transmitted back to the remote caller via the transceiver 54. Accordingly, a true full-duplex speakerphone conversation can be carried on between the parties.

Acoustic echo suppression/reduction according to some embodiments may be more transparent under conditions of downlink noise and/or double talk compared to conventional echo suppression/reduction techniques. Furthermore, the mechanical design of a telephone may be less restricted. For example, the speakers 12L, 12R may be located closer to the microphone 14. In some embodiments, such as the embodiments illustrated in FIGS. 1 to 3B, the stereo speakers 12L, 12R may be located on the same side of the housing 15 as the microphone 14.

In another example, a mobile telephone 100 may play a ring tone upon receipt of an incoming call. In some cases, a mobile telephone 100 according to some embodiments may also be configured to permit voice answering while playing the ring tone. For example, upon receipt of an incoming call, the mobile telephone 100 may generate a ring tone and/or retrieve a ring tone specified by the user from the memory 58. The ring tone may be stored as a stereophonic digital audio signal or a monaural digital audio signal, for example as a . WAV file (or any other suitable digital audio format) that contains digital audio information. If the ring tone is a stereophonic audio signal, the controller 50 may convert the ring tone signal into a monaural audio signal, for example, by combining and/or ignoring channels of the stereophonic signal. The conversion of stereophonic signals to monaural signals is well known in the art of digital signal processing and need not be described further.

The monaural ring tone signal may have a value represented by X(n). The ring tone signal is inverted by the controller 50 to form an inverted signal −X(n). The ring tone signal X(n) and the inverted ring tone signal −X(n) are converted to analog, for example via first and second digital-to-analog converters 66L, 66R to form first and second audio signals 120L and 120R having analog values of X(t) and −X(t) respectively.

The first audio signal 120L is played over the first speaker 12L, and the second audio signal 120R is played over the second speaker 12R. As described above, the first and second audio signals 12L, 12R interfere destructively with each other at the microphone 14, which in turn may be used to receive a voice command from the user, such as "answer" or "transfer to voicemail." The acoustic suppression of the ring tone signal at the microphone 14 may improve the signal to noise ratio of the voice command received at the microphone 14, permitting the controller 50 to more accurately interpret the voice command.

In some embodiments, if a voice answer mode is not enabled, no echo suppression may be performed, in which case a stereo ring signal would not be converted to a monaural signal and inverted. However stereo widening may be performed on the ring signal.

Figure 7B:
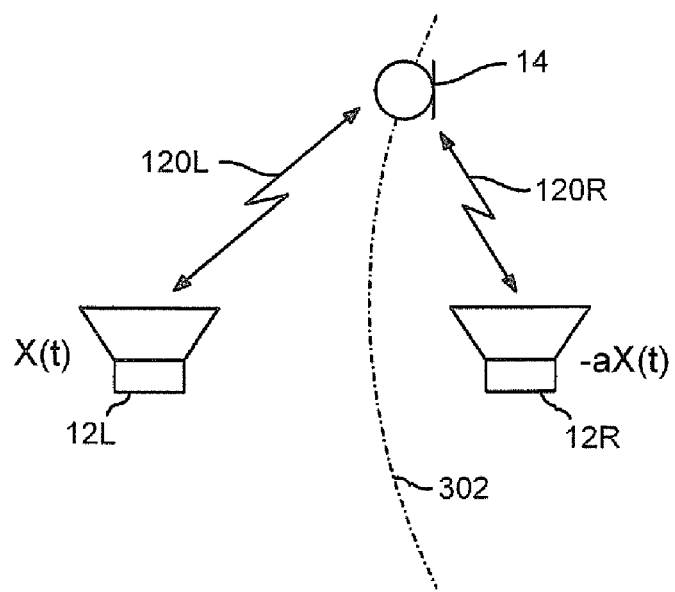

Acoustic echo suppression according to further embodiments is illustrated in FIG. 7B. In some cases, it may not be desirable to locate the microphone 14 in a medial plane that is equidistant between the first and second speakers 12L, 12R. For example, in some applications, the user may be likely to hold the device 100 so that the user's head is positioned along the medial plane. In that case, the user may experience some undesired destructive interference of sound waves output by the speakers 12L, 12R. Accordingly, it may be desirable to position the microphone 14 at a location other than along the medial plane and modify the sound output by the speakers 12L, 12R so that sound cancellation/reduction occurs at the location of the microphone 14.

Referring again to FIG. 6B, as was noted above, destructive interference also occurs along arcs of cancellation 302. However, as noted above, assuming that the power of both signals output by the sources 12L, 12R is the same, destructive interference along arcs 302 will not result in total cancellation of the waves, since wave power decreases with distance from the source, and the arcs 302 describe locations that are not equidistant from the sources 12L, 12R. Accordingly, in some embodiments, the microphone 14 may be positioned at a location along one of the arcs 302 and the signal power output by one of the speakers 12L, 12R may be changed, so that the power received at the location of the microphone 14 from the first and second speakers 12L, 12R is about equal.

Thus, referring to FIG. 7B, the microphone 14 is positioned along a locus of cancellation that includes the arc 302, and the relative volume output by the speakers 12L, 12R is changed, for example by multiplying the signal output by the second speaker 12R by a constant a (which may be greater or less than one), so that the power received at the location of the microphone 14 from the first and second speakers 12L, 12R is equal, and cancellation will occur at the location of the microphone 14.

It will be appreciated that the location of the arc of cancellation 14 is determined by the distance between the speakers 12L, 12R and by the frequency/phase of the sound being output. Thus, for sound having multiple frequencies (i.e. any sound except a monotone), simply scaling the sound output by one of the speakers 12L, 12R may not result in substantial cancellation/reduction of sound received at a given location. Accordingly, in some embodiments, the sound output by a particular speaker can be filtered, for example by a filter 64L, 64R (FIG. 5B), to alter the amplitude/phase of an audio signal, or the amplitudes/phases of different frequency components of the audio signal, in order to position the arc of cancellation for each of the frequency components so that it will correspond to the location of the microphone 14. That is, a different transfer function can be applied to different ones of the audio signals, and/or to different frequency components of an audio signal in order to promote acoustic cancellation/reduction of sound output by the speakers 12L, 12R at the location of the microphone 14.

Figure 8:
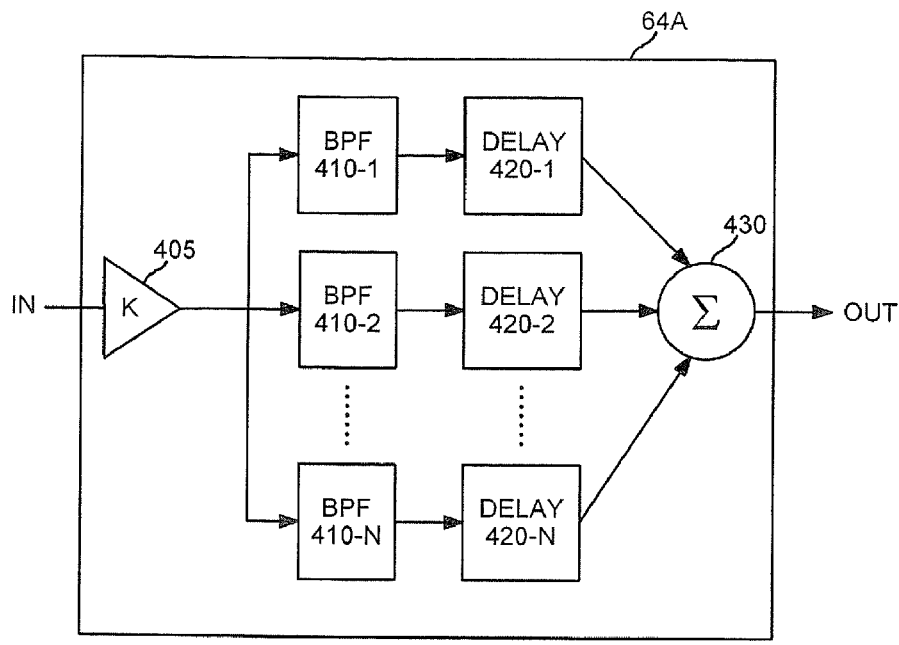
FIG. 8 is a block diagram of an audio filter according to embodiments of the invention.

An exemplary filter 64A that can be used to filter an audio signal is illustrated in FIG. 8. As shown therein, an audio signal can be amplified by an amplifier 405 having a gain K and separated into individual frequency components by a bank of bandpass filters 410-1 to 410-N. Each of the individual frequency components can then be delayed by delay elements 420-1 to 420-N, which change the phases of the individual frequency components, thereby providing a respective phase offset for each of the individual frequency components. The individually delayed/offset frequency components can then be recombined at a combining node 430. As noted above, the delays of the individual delay elements 420-1 to 420-N can be chosen to position the arc of cancellation for the frequencies delayed by the delay elements at or near the location of the microphone 14. In addition, other filtering can be performed by the filter 464.

The gain K of the amplifier 405 and the delays of the delay elements 420-1 to 420-N can be determined at design time. However, it is also possible to determine the appropriate parameters empirically, for example during factory calibration. An adaptive digital signal processing algorithm may also be used to tune the filter 464 at design time, during calibration and/or at a later time.

Figure 9:
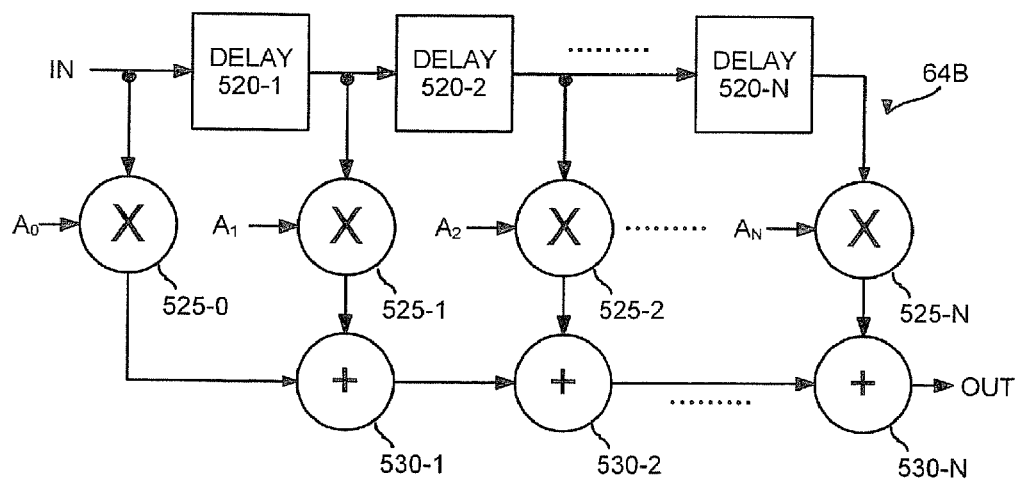
FIG. 9 is a block diagram of another audio filter according to embodiments of the invention.

Another exemplary filter 64B that can be used to filter an audio signal is illustrated in FIG. 9. As illustrated therein, the filter 564 can be implemented as a transversal finite impulse response (FIR) filter that includes N delay elements 520-1 to 520-N. The input signal and each delayed signal is multiplied by a filter coefficient $A_0$ to $A_N$ at corresponding multipliers 525-0 to 525-N, and the resulting outputs are combined at combining nodes 530-1 to 530-N to form the output signal. The filter coefficients $A_0$ to $A_N$ can be selected to provide a desired level of acoustic suppression at the location of the microphone.

As noted above, the filters used for the left channel and the right channel can be different (i.e., can have different filter coefficients), and can be configured so that sounds output by the left and right speakers interfere destructively at the location of the microphone, which may or may not be located at a point that is equidistant from both of the speakers.

The filter coefficients for a first filter used to process a first signal, such as the left channel signal, can be tuned to equalize the output signal to account for variations in the frequency response of the corresponding speaker. The filter coefficients of the second filter used to process the second signal can be selected to provide a desired level of destructive interference at the location of the microphone. For example, when the microphone is located closer to one speaker than the other, the filter coefficients of the filter for the speaker located farther from the microphone can be tuned to equalize the output signal to account for variations in the frequency response of the speaker, while the filter coefficients of the filter for the speaker located closer to the microphone can be selected to provide a desired level of destructive interference at the location of the microphone.

In some embodiments, the filter coefficients of the second filter can be optimized from a set of starting filter coefficients. The set of starting filter coefficients for the second filter can, for example, be a scaled and inverted version of the filter coefficients for the first filter.

According to some embodiments, the mode of operation of a mobile telephone 100 and/or the filter coefficients used for acoustic echo suppression can change depending on the physical configuration of the telephone 100. For example, if the mobile telephone is a flip- or slider-type telephone, acoustic echo cancellation as described above can be performed when the telephone is in a "closed" position with a first set of filter coefficients configured to provide the desired echo suppression in the open position, and when the telephone is in the "open" position, acoustic echo suppression may be performed with a different set of filter coefficients configured to provide the desired echo suppression in the open position. Different sets of filter coefficients may be used for the left channel filter and/or the right channel filter when the telephone 100 is in different positions (i.e. open vs. closed), because, for example, the microphone may be located in a different location depending on whether the telephone 100 is in the open or closed position. In addition, the audio path from the speakers to the microphone may be different due to changes in the physical configuration of the telephone 100. In some embodiments no echo suppression may be performed when the telephone 100 is in a particular configuration, such as the open position.

As noted above, some embodiments of the invention may be able to reduce echo received at a microphone by up to 30 dB. Such echo reduction may reduce the cost and/or complexity of the microphone, since the microphone may only have to be able to handle the dynamic range of speech, and not the possibly much louder sound from the speakers. Furthermore, providing significant acoustic echo cancellation/reduction may enable the use of less complicated and/or less expensive electronic echo cancellation/reduction circuitry/algorithms while achieving transparent, full-duplex communication.

In the drawings and specification, there have been disclosed typical embodiments of the invention and, although specific terms are employed, they are used in a generic and descriptive sense only and not for purposes of limitation, the scope of the invention being set forth in the following claims.

The invention claimed is:

1. An electronic device, comprising:
   first and second speakers;
   a microphone positioned between the first and second speakers, such that the microphone is within a volume of space between a first plane extending through the first speaker and normal to a line extending between the first and second speakers, and a second plane extending through the second speaker and normal to the line extending between the first and second speakers; and
   circuitry configured to generate first and second audio signals in response to a source audio signal, to play the first audio signal over the first speaker, and to play the second audio signal over the second speaker, the circuitry comprising a first filter configured to filter the source signal to generate the first audio signal and a second filter configured to generate the second audio signal;
   wherein the first and second audio signals are configured, and the first and second speakers are positioned, so that the first audio signal output by the first speaker and the second audio signal output by the second speaker combine destructively at the microphone,
   wherein the electronic device includes a housing that is movable between a first position and a second position; and
   wherein when the housing is in the first position the first filter includes a first set of filter coefficients and the second filter includes a second set of filter coefficients configured to cause the first and second audio signals to interfere destructively at the microphone, and when the housing is in the second position the second filter includes a third set of filter coefficients configured to cause the first and second audio signals to interfere destructively at the microphone.

2. The electronic device of claim 1, wherein the second audio signal comprises an inverted replica of the first audio signal.

3. The electronic device of claim 1, wherein the second audio signal comprises a scaled and inverted replica of the first audio signal.

4. The electronic device of claim 1, wherein the first audio signal comprises a plurality of frequencies, wherein the second audio signal comprises a plurality of frequencies, wherein respective ones of the plurality of frequencies of the second audio signal are scaled and phase shifted relative to corresponding ones of the plurality of frequencies of the first audio signal.

5. The electronic device of claim 1, wherein the circuitry phase shifts the second audio signal relative to the first audio signal so that the sound generated by the first and second speakers destructively combines at a location of the microphone.

6. The electronic device of claim 1, wherein the first filter includes a first set of filter coefficients configured to equalize the source signal and the second filter includes a second set of filter coefficients configured to cause the first and second audio signals to interfere destructively at the microphone.

7. The electronic device of claim 1, wherein the electronic device comprises a mobile telephone configured to operate in a speakerphone mode and a non-speakerphone mode, and wherein the controller is configured to play the first audio signal over the first speaker, and to play the second audio signal over the second speaker in the speakerphone mode.

8. The electronic device of claim 1, wherein the circuitry is configured to receive the source audio signal as a stereophonic signal, to convert the source audio signal to a first monaural signal, and to generate the second audio signal as a second monaural signal from the first monaural signal.

9. The electronic device of claim 1, wherein the source audio signal comprises a ring tone, and the circuitry is further configured to play the first audio signal over the first speaker and the second audio signal over the second speaker in response to an incoming call.

10. The electronic device of claim 9, wherein the device is configured to operate in a voice answer mode, and wherein the circuitry is configured to receive a voice signal using the microphone while playing the first audio signal over the first speaker and the second audio signal over the second speaker when the device is in the voice answer mode.

11. The electronic device of claim 1, wherein the microphone is positioned on an arc of cancellation relative to the first speaker and the second speaker, and wherein the circuitry adjusts a power level of the first audio signal or the second audio signal so that the power of the first audio signal received at the microphone is about equal to the power of the second audio signal received at the microphone.

12. The electronic device of claim 11, wherein:
the second audio signal comprises a scaled and inverted replica of the first audio signal;
the first audio signal comprises a plurality of frequencies;
the second audio signal comprises a plurality of frequencies; and
the circuitry phase shifts respective ones of the plurality of frequencies of the second audio signal relative to corresponding ones of the plurality of frequencies of the first audio signal by respective phase offsets so that the sound generated by the first and second speakers destructively combines at a location of the microphone.

13. A method of operating a portable electronic device including first and second speakers and a microphone positioned relative to the speakers, the method comprising:
generating first and second audio signals in response to a source audio signal playing the first audio signal over the first speaker; and
playing the second audio signal over the second speaker;
wherein the first and second audio signals are generated so that the first audio signal output by the first speaker and the second audio signal output by the second speaker combine destructively at the microphone;
wherein the microphone is positioned between the first and second speakers, such that the microphone is within a volume of space between a first plane extending through the first speaker and normal to a line extending between the first and second speakers, and a second plane extending through the second speaker and normal to the line extending between the first and second speakers, and
wherein the source audio signal comprises a ring tone, the method further comprising playing the first audio signal over the first speaker and the second audio signal over the second speaker in response to an incoming call, and receiving a voice signal using the microphone while playing the first audio signal over the first speaker and the second audio signal over the second speaker.

14. The method of claim 13, wherein the second audio signal comprises an inverted replica of the first audio signal.

15. The method of claim 13, wherein the second audio signal comprises a scaled and inverted replica of the first audio signal.

16. The method of claim 13, wherein the first audio signal comprises a plurality of frequencies, wherein the second audio signal comprises a plurality of frequencies, the method further comprising scaling and phase shifting respective ones of the plurality of frequencies of the second audio signal relative to corresponding ones of the plurality of frequencies of the first audio signal.

17. The method of claim 13, further comprising receiving the source audio signal as a stereophonic signal, converting the source audio signal to a first monaural signal, and generating the second audio signal as a second monaural signal.

18. The method of claim 13, further comprising filtering the source signal with a first filter to generate the first audio signal and with a second filter to generate the second audio signal.

19. The method of claim 18, wherein the first filter includes a first set of filter coefficients configured to equalize the source signal and the second filter includes a second set of filter coefficients configured to cause the first and second audio signals to interfere destructively at the microphone.

20. The method of claim 18, wherein the portable electronic device includes a housing that is movable between a first position and a second position; and
wherein when the housing is in the first position the first filter includes a first set of filter coefficients and the second filter includes a second set of filter coefficients configured to cause the first and second audio signals to interfere destructively at the microphone, and when the housing is in the second position the second filter includes a third set of filter coefficients configured to cause the first and second audio signals to interfere destructively at the microphone.

* * * * *